United States Patent Office 3,163,355
Patented Dec. 29, 1964

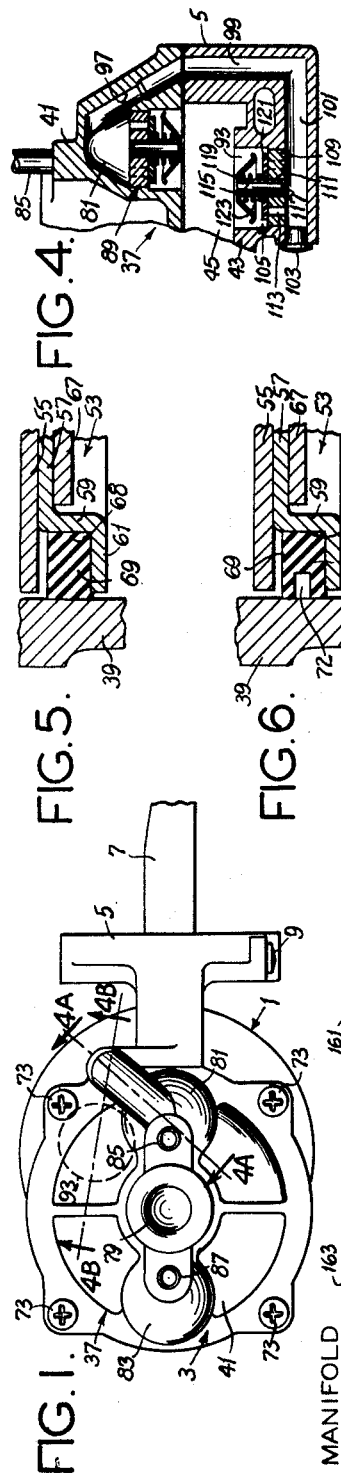

3,163,355
FUEL PUMP
Alfred C. Korte, Jennings, Mo., assignor to ACF Industries, Incorporated, New York, N.Y., a corporation of New Jersey
Original application June 30, 1958, Ser. No. 745,358. Divided and this application Dec. 21, 1961, Ser. No. 161,015
7 Claims. (Cl. 230—188)

This invention relates to vacuum boosters especially for use in connection with the engine of an automotive vehicle adapted to supplement, when required, the vacuum obtainable from the intake manifold of the engine for effective operation of vacuum-operated automative accessories, such as windshield wipers, and more particularly to a booster pump construction for such use.

With the wider, wrap-around windshields on present automotive vehicles, the blades of the windshield wipers of the vehicles are more heavily loaded than heretofore, and require more powerful vacuum motors and hence more powerful boosters for positive continuous wiper action. Booster pumps are conventionally diaphragm-type pumps, but since the effective area of the diaphragm in such a pump is only a portion of its total area, the volumetric efficiency of a diaphragm-type booster pump is relatively low. Thus, for high capacity, a diaphragm-type booster pump must be made of such size as to take up considerable space under the hood of a vehicle, where space is at a premium.

Accordingly, it is an object of this invention to provide a booster pump which, while being compact so as not to take up an undue amount of space under the hood of a vehicle, is of relatively high volumetric efficiency and hence of relatively high capacity as regards a conventional diaphragm-type booster pump of comparable size, and which is capable of developing sufficient vacuum for operation of a vacuum wiper motor to provide adequate wiper blade activity despite heavy blade loading and relatively high wiper displacement. In accordance with this object, the pump of this invention is a piston-type pump of relatively high volumetric efficiency, and of the double-acting type for greater capacity.

An automotive vehicle is conventionally equipped with a fuel pump, usually a mechanical fuel pump of the diaphragm type, for pumping fuel to the carburetor for the engine. One type of mechanical fuel pump of this class has a housing in which is pivoted a rocker arm for actuating the fuel pump diaphragm, this housing being adapted for connection to the engine in communication with the crankcase of the engine.

A feature of the present invention is that the double-acting piston type vacuum booster pump is made part of a combined fuel pump and booster pump unit, utilizing the rocker arm for actuating both the diaphragm of the fuel pump and the piston of the booster pump, one object of this construction being economy of manufacture.

Another object of the invention is the provision of a construction such as above described which provides for lubrication of the booster pump by oil reaching the rocker arm housing from the engine crankcase, with the arrangement such as to provide for return of any excess oil from the booster pump to the housing, the booster pump also acting to pump air into the rocker arm housing to tend to ventilate the crankcase, as is desirable.

A further object of the invention is the provision of a vacuum circuit including the double-acting piston-type vacuum booster pump by means of which the booster pump is maintained inactive when the manifold vacuum is above a pretermined level, and activated in response to decrease in manifold vacuum below that level to supply auxiliary power to the wiper motor. This circuit is also such that when the wiper is not operating, the booster pump functions on a standby basis at a considerably reduced stroke.

Other objects and features will be in part apparent and in part pointed out hereinafter.

The invention accordingly comprises the constructions hereinafter described, the scope of the invention being indicated in the following claims.

This application is a division of my copending application Serial Number 745,358 and filed on June 30, 1958, and now abandoned.

In the accompanying drawings, in which several of various possible embodiments of the invention are illustrated, FIGURE 1 is a plan view of a combined fuel pump and booster pump unit incorporating the invention, parts being broken away;

FIGURE 2 is a view in elevation of the FIGURE 1 unit with parts broken away and shown in section, also illustrating the vacuum circuit in which the booster pump is included;

FIGURE 3 is a view in elevation of FIGURE 2 as viewed from the right, omitting an eccentric shown in FIGURE 2;

FIGURE 4 is an ideal vertical section, the upper part thereof being in section on line 4A—4A of FIGURE 1 and the lower part thereof being in section on line 4B—4B of FIGURE 1, the piston of the booster pump being omitted;

FIGURE 5 is an enlarged fragment of FIGURE 1 illustrating a packing for the piston of the booster pump;

FIGURE 6 is a view similar to FIGURE 5 illustrating a modification of the booster pump piston packing; and, FIGURE 7 is a cross section of a double check valve included in the vacuum circuit, taken on line 7—7 of FIGURE 2.

Corresponding reference characters indicate corresponding parts throughout the several views of the drawings.

Referring to the drawings, there is shown a combination fuel pump and vacuum booster pump unit of this invention, the fuel pump part of the unit being designated 1 and the booster pump part of the unit being designated 3. These units have in common a rocker arm housing 5 and a rocker arm 7 pivoted at 9 in the housing. It will be understood that the unit is mounted on an internal combustion engine as by means of an adaptor 11 with housing 5 in communication with the crankcase of the engine. Accordingly, housing 5 contains oil fumes from the crankcase. On the outer end of the rocker arm is a slidable shoe 13. When the unit is mounted on the engine, this shoe is engaged by an eccentric 15 on the engine cam shaft 17. A spring 19 biases the rocker arm in the direction (counterclockwise as shown in FIGURE 2) to maintain the shoe in engagement with the eccentric.

The fuel pump 1 is a diaphragm type of pump. It may be of any suitable construction; for example, it may be of the type shown and described in the Coffey United States Patent 2,803,265, issued August 20, 1957. The diaphragm 21 of the fuel pump is mounted at the lower end of a stem 23. The housing 5 includes a downwardly extending enclosure 25 for the diaphragm. A spring 27 in the enclosure biases the diaphragm downward. The stem 23 extends slidably through a packing member 29 held at the upper end of enclosure 25 in an opening 31 between the housing 5 and enclosure 25. Spring 27 surrounds the stem. The latter extends up into the inner end of housing 5 and through a slot 33 in the inner end of the rocker arm 7, and has a head 35 at its upper end. The rocker arm is engageable with head 35 for lifting the stem 23 to load spring 27.

The booster pump 3 comprises a cylinder designated in its entirety by the reference character 37. This cylinder is constituted by an upwardly extending annnular wall 39 which, as shown, is integrally formed on the housing 5 above the enclosure 25, by a head 41 at the upper end of wall 39, and by a bottom end wall or partition 43 also formed as an integral part of housing 5. Wall 39 defines a pumping chamber 45. This is closed at its upper end by head 41 and at its lower end by the wall or partition 43, the latter dividing the interior of housing 5 and the chamber. The partition 43 is formed with a central bearing portion 47 in which is an opening 49.

In accordance with this invention, a piston rod 51 is vertically slidable in opening 49, having a sufficiently loose sliding fit in the opening as to provide a restricted passage 49a around the rod through which oil fumes may enter the pumping chamber 45 for lubrication purposes as will be made clear. This passage 49a, exaggerated for purposes of illustration in FIG. 2, is so restricted, however, as to avoid any substantial air leakage. Rod 51 extends down into the inner end of housing 5, its lower end being engageable by the inner end of the rocker arm 7. A piston 53 is fixed on the upper end of rod 51 in the chamber.

As shown in FIGURES 2 and 5, piston 53 comprises a pair of circular sheet metal plates 55 and 57. The upper plate 55 is a flat plate having a diameter slightly less than the inside diameter of the annular wall 39. The lower plate 57 has a downwardly extending annular cylindric skirt 59 and a flat rim 61 extending out from the edge of the skirt. The outside diameter of this rim is slightly less than the inside diameter of wall 39. The piston rod has a reduced-diameter upper end portion 63 providing an upwardly facing annular shoulder 65. Seated on this shoulder is a rigid circular backing plate 67 having a diameter somewhat less than the inside diameter of the skirt 59. Plate 57 is seated on plate 67 with the skirt 59 extending downward around the periphery of plate 67. The skirt 59 and rim 61 provide a groove 68 receiving a flat resilient packing ring 69, which may be made of a suitable oil-resistant synthetic rubber.

The thickness of the packing ring 69 is somewhat less than the width of the groove 68 (the height of the skirt 59). Plate 55 is seated on the central portion of the plate 57 and confines the packing ring in the groove. In the manufacture of pumps of this invention, the packing rings may be made in the following manner: A relatively thick-walled rubber tubing having an inside diameter slightly less than the outside diameter of the skirt 59 and an outside diameter somewhat greater than the inside diameter of chamber 45 is formed by extrusion. There is no requirement for maintaining precision of either the inside or outside diameter of the extrusion. These diameters need not be uniform throughout the length of the extrusion. A mandrel having a diameter equal to the outside diameter of skirt 59 is inserted in a length of the tubing. Since the inside diameter of the length of tubing is slightly under size as regards the mandrel, the tubing is expanded to some extent. Then the length of tubing is exteriorly ground or otherwise machined to bring its outside diameter down to that required for a sliding sealing fit in chamber 45. Then the length of tubing is cut on a lathe into individual rings 69 of the required thickness. The individual rings are then stripped from the mandrel, and contract radially with the result that the inside and outside diameter of each ring is slightly reduced, the inside diameter becoming slightly less than the outside diameter of the skirt 59.

In assembling the piston 53 and piston rod 51, a ring 69, made as above described, is applied around the skirt 59 of the lower sheet metal plate 57 of the piston. This stretches the ring back to the proper dimensions which it had when on the mandrel. Plates 67, 57 and 55 have central holes for receiving the reduced-diameter upper end portion 63 of the piston rod 51. Plate 67 is applied to portion 63 seating on shoulder 65, then plate 57 with ring 59 thereon is applied, and then plate 55. A nut 71 is then screwed on the upper end of portion 63, which is threaded for the purpose, for clamping the plates together. The assembly of the piston 53 and piston rod 51 is then inserted in chamber 45. Since the ring 59 has been stretched back to the proper dimensions, its outside diameter is such as to have a sliding sealing fit in chamber 45, and its inside periphery has a sliding sealing fit against the skirt 59 (the bottom of the groove 68). Thus, even though the lathe-cut rings as removed from the mandrel may not be uniform in size, due to non-uniformity of the original tubing which is apt to occur during extrusion, any ring when applied to skirt 59 has the proper inside and outside diameters for sealing purposes. With the thickness of ring 69 less than the width of groove 68, the ring has axial clearance in the groove and hence is free to expand axially when radially compressed, and to slide axially to some extent relative to the plates. Being free to expand axially, the ring readily adapts itself for sealing against the inside surface of wall 39, without requiring accurate machining of the latter. The construction is also such as to tend to hold the piston rod against canting in opening 49 and to tend to minimize heating. The plates 67, 57 and 55 may be made by stamping operations and do not require any machining.

As shown in FIGURE 5, the outside edge of ring 69 is unrelieved. However, as shown in FIGURE 6, it may be provided with a groove as indicated at 72 for relief.

The head 41 is constituted by a separate casting fastened to the wall 39 as by screws 73. It is formed with an axial recess 75 opening downward in the direction toward the pumping chamber 45. A coil compression spring 77 is received in this recess, reacting from the outer (upper) end of the recess against the piston 53 for driving it downward. The head is formed with a tapered axial re-entrant projection 79 extending down in the recess for centering the spring and filling the space within the spring 77 and recess 75 for volumetric efficiency of the pump. Re-entrant projection 79 terminates short of the lower end of the recess 75 to provide space for the nut 71 when the piston 53 is at the upper end of its stroke. The head 41 is formed with a vertical dome-shaped inlet passage 81 and a vertical dome-shaped outlet passage 83 located radially outward of the recess 75 and diametrically opposite one another. An inlet nipple 85 extends up from the head in communication with the inlet passage 81 and an outlet nipple 87 extends up from the head in communication with the outlet passage 83. The inlet passage 81 is provided with a check valve 89 adapted to open in the direction toward the pumping chamber 45 (downward) and the outlet passage 83 is provided with a check valve 91 adapted to open in the direction away from the pumping chamber (upward).

The partition 43 is formed with a vertical inlet passage 93 (see FIGURE 4) and a vertical outlet passage 95 (see FIGURE 2) located radially outward of the central piston rod bearing portion 47. The outlet passage 95 is generally directly below the outlet passage 83 in the head 41, and opens into the inner end of rocker arm housing 5. The inlet passage 93, instead of being diametrically opposite the outlet passage 95, is angularly offset from the radial plane of passage 81 as appears in FIGURE 1. FIGURE 4, for convenience, is drawn with the parts appearing as if they were turned to bring passages 81 and 93 into the same plane. The head 41 has an inclined bore 97 extending up from its bottom intersecting the upper inlet passage 81. When the head is secured on the upper end of the annular wall 39, the lower end of bore 97 registers with a vertical bore 99 in the wall. Housing 5 has a horizontal bore 101 traversing the lower end of the lower inlet passage 93 and extending to the lower end of the vertical bore 99. The outer end of the horizontal bore 101 is plugged as indicated at 103 in FIGURE 4. Bores 101, 99 and 97 provide a passage interconnecting the upper and lower inlet passages 81 and 93. The lower inlet passage 93 is provided with a check valve 105 adapted to open in the direction toward the pumping chamber (upward). The lower outlet passage 95 is provided with a check valve 107 adapted to open in the direction away from the pumping chamber (downward toward the interior of housing 5).

The check valves 89, 91, 105 and 107, as shown, are all identical. Each comprises a circular valve seat 109 having a central hole 111 and a series of ports 113, such as arcuate slots, around the hole 111. Press-fitted in the hole 111 is a hollow stem 115 closed as indicated at 117 at its end in the hole, and having its other end a mushroom head constituting a spring seat 119. A ring-shaped disk valve member 121, which may be made of a suitable oil-resistant synthetic rubber for cushioned sealing, is slidable on the stem 115, and is biased toward engagement with the valve seat by a coil compression spring 123 surrounding the stem reacting from the seat 119. As to each of the four check valves, the valve seat 109 is press-fitted and positioned horizontally in the respective passage 81, 83, 93, 95, with the disk valve member 121 and stem 115 on the appropriate side for inward or outward opening of the valve member, as the case may be. Thus, the stems 115 of the valve 105 for inlet passage 93 and the valve 91 for outlet passage 83 extend upward, and the stems 115 of the valve 107 for outlet passage 95 and the valve 89 for inlet passage 81 extend downward.

The booster pump 3 is adapted to be connected in series-parallel relation with a vacuum-operated accessory, such as a windshield wiper motor, and the intake manifold of the engine in the manner shown in FIGURE 2, with a double check valve such as indicated at 125 in FIGURE 2 and detailed in FIGURE 7 in the circuit. As shown in FIGURE 7, this double check valve comprises a cup-shaped body 127 divided into two chambers 129 and 131 by a partition 133 and closed by a head 135. The head 135 has a passage 137 and ports 139 and 141 providing for communication between passage 137 and chambers 129 and 131. It also has nipples 143 and 145, nipple 143 being for connection of a line to the wiper motor, the other nipple 145 being for connection of a line to another vacuum-operated accessory if desired. Nipple 145 in this instance is shown as capped. The head 135 is formed with check valve seats 147 and 149 around ports 139 and 141 engageable by opposite end portions of a rubber flapper valve member 151. Springs 153 and 155 are provided in chambers 129 and 131 engageable with the end portions of member 151 to bias them toward engagement with the seats 147 and 149. The body has lateral nipples 157 and 159 providing for connection of lines to chambers 129 and 131.

As illustrated in FIGURE 2, a line 161 interconnects the nipple 87 of the booster pump 3 and the nipple 159 of the double check valve 125 and the intake manifold of the engine, a fitting 163 being provided for the latter purpose. A line 165 interconnects the nipple 85 of the booster pump and the nipple 157 of the double check valve. A line 167 connects the nipple 143 of the double check valve to the windshield wiper motor (not shown). It will be understood that line 167 has a conventional wiper motor control valve therein.

Operation is as follows:

Assuming that the windshield wiper motor is in operatom, the booster pump 3 will either be in operation or out of operation, depending upon the level of manifold vacuum. The manifold vacuum is transmitted to the space in the booster pump above the piston 53 via the portion of the line 161 between the fitting 163 and the nipple 87. Assuming that the level of manifold vacuum is such that the pressure differential on the booster pump piston 53 is equal to or above that required to overcome the force of the piston-biasing spring 77, the piston 53 will remain at the upper end of its stroke. Under these circumstances, a vacuum is drawn in the wiper motor through line 167, passage 137 in the head of valve 125, port 141 (the flapper valve member 151 opening in the direction away from the wiper motor and away from seat 149), chamber 131, and line 161. The booster pump remains inactive, rocker arm 7 simply idling as regards the piston rod 51, the inner end of the rocker arm moving away from the lower end of rod 51 on downward movement of the inner end of the rocker arm as illustrated by the dotted line position of the rocker arm in FIGURE 2.

When the manifold vacuum falls below the level required to hold the piston 53 at the upper limit of its stroke, the booster pump becomes active, spring 77 acting to drive the piston downward and rocker arm 7 acting to drive it back upward to the upper end of its stroke. The length of the stroke varies in accordance with the level of vacuum. Upon downward movement of the piston, valves 89 and 107 open, and valves 91 and 105 close. Thus, the piston 53 acts to draw additional vacuum for operating the wiper motor via line 167, passage 137, port 139 (the flapper valve member 151 opening in the direction away from the wiper motor and away from the seat 147), chamber 129, line 165, and inlet passage 81. The space below the piston 53 is vented to the interior of the rocker arm housing 5 via passage 95. Upon upward movement of the piston, valves 89 and 107 close, and valves 91 and 105 open. The piston thereupon acts to draw additional vacuum for operating the wiper motor via line 167, passage 137, port 139, chamber 129, line 165, inlet passage 81, passages 97, 99, 101 and inlet passage 93. The space above the piston 53 is vented via passage 83 and the portion of line 161 connecting nipple 87 and the fitting 163. Flapper valve member 151 closes on seat 149 to block off line 161 from passage 137 and prevent air from being vented into passage 137 which would otherwise reduce the vacuum supplied to the wiper motor.

With the rocker arm housing 5 in communication with the crankcase of the engine, and with piston rod 51 having the stated loose fit in bearing 47, oil fumes from housing 5 may enter the space in chamber 45 below the piston 53 and condense upon the interior surface of wall 39 for lubrication purposes. Any excess of oil is forced out of the chamber 45 through passage 95 upon downward strokes of the piston (valve 107 opening on downward strokes of the piston). Air forced out of the chamber 45 through passage 95 upon downward strokes of the piston passes into the housing 5 and thence to the crankcase to tend to augment ventilation of the crankcase.

In actual operation of the booster pump on an engine, due to normal frequent fluctuations in manifold vacuum, the length of stroke of the piston 53 fluctuates. Whatever the length of stroke, however, the upper limit of the stroke is the same. Thus, even though the piston should operate through a full stroke for an interval and wipe the interior surface of wall 39 clean, the stroke will shortly be lessened, so that at least some of the wiped-clean area of the interior surface of wall 39 will again receive a film of oil for adequate lubrication.

On strokes of the piston 53 and piston rod 51 shorter than the throw of the inner end of rocker arm 7, the inner end of the rocker arm moves away from the lower end of the piston rod in completing its downward movement, then on the ensuring upward movement of the inner end of the rocker arm, it bumps the lower end of the piston rod and drives the latter upward. Since the thickness of piston ring 69 is less than the width of the grooves 68, the ring is adapted in effect to float relative to the piston. Thus, on a downstroke of the piston from the position shown in FIGURE 2, the piston tends to move down relative to the ring and then the margin of upper plate 55 engages the ring to drive the ring down. On an upstroke of the piston the action is reversed. On very short strokes of the piston, less than the clearance of ring 69 in groove 68, the ring may not move at all, the piston idling downward and upward within the ring. This action tends to avoid such stressing of the ring as would tend to make it become heated.

When the wiper is not operating, the booster pump 3 remains on a standby basis, the piston 53 idling at a considerably reduced stroke.

The booster pump 3 is of relatively high volumetric efficiency, there being a minimum of clearance volume in the pump cylinder at the ends of the stroke of the piston 53. Being volumetrically efficient and double-acting, the pump may be made of relatively small size for relatively high capacity so as to provide ample auxiliary vacuum to the wiper motor whenever required.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A vacuum booster pump comprising a cylinder, said cylinder comprising an annular wall defining a pumping chamber, an end wall at one end of said chamber having an opening connected to a source of oil vapor and a head at the other end of said chamber, a piston rod slidable in said opening in said end wall, a piston on said rod in the cylinder, said piston having a peripheral groove, a flat resilient packing ring in the groove, said ring having a sliding sealing fit on the interior of said cylinder and the bottom of the groove, and being free to slide in the groove, said rod having a sufficiently loose fit in said opening as to provide a restricted passage for entry of sufficient oil vapors to the cylinder for lubricating said piston without substantial air leakage, a spring reacting from the head against the piston adapted to drive the piston in the direction toward said end wall, said head having an inlet passage and an outlet passage, said end wall having an inlet passage and an outlet passage, each inlet passage having a check valve therein adapted to open in the direction toward the chamber, and each outlet passage having a check valve therein adapted to open in the direction away from the chamber.

2. Vacuum booster means for a vacuum-operated accessory on an automotive vehicle which has an engine having an intake manifold, said vacuum booster means comprising a double-acting piston pump having first and second inlets on opposite sides of its piston and first and second outlets on opposite sides of its piston, check valves in said inlets and outlets respectively, means biasing said piston in the direction away from the first inlet and outlet, means for driving the piston in the opposite direction, means forming a first interconnection for the inlet passages and said accessory, a check valve in said first interconnection adapted to open in the direction away from said accessory, means forming a second interconnection for said intake manifold and said accessory and said first outlet, and a check valve in said second interconnection adapted to open in the direction away from the accessory.

3. Vacuum booster means for a vacuum-operated accessory on an automotive vehicle which has an engine having an intake manifold, said vacuum booster means comprising a vacuum booster pump, said pump comprising a cylinder, said cylinder comprising an annular wall defining a pumping chamber, an end wall at one end of said chamber and a head at the other end of said chamber, a piston rod slidable in an opening in said end wall, a piston on said rod in the cylinder, a spring reacting from the head against the piston adapted to drive the piston in the direction toward said end wall, said head having an inlet passage and an outlet passage extending longitudinally relative to the cylinder, said end wall having an inlet passage and an outlet passage extending longitudinally relative to the cylinder, each inlet passage having a check valve therein adapted to open in the direction toward the chamber, each outlet passage having a check valve therein adapted to open in the direction away from the chamber, a first interconnection for the inlet passage in the head and said accessory, a check valve for said first interconnection adapted to open in the direction away from said accessory, a second interconnection for said intake manifold and said accessory and the outlet passage in the head, and a check valve for said second interconnection adapted to open in the direction away from the accessory.

4. A vacuum booster pump comprising a cylinder, said cylinder comprising an annular wall defining a pumping chamber, an end wall at one end of said chamber having an opening connected to a source of oil vapor and a head at the other end of said chamber, a piston rod slidable in said opening in said end wall, a piston on said rod in said cylinder and having a sliding sealing fit on the interior of said cylinder, said rod having a sufficiently loose fit in said opening as to provide a restricted passage for entry of sufficient oil vapors to said cylinder for lubricating said piston without substantial air leakage, a spring reacting from said head against said piston and adapted to drive said piston in the direction toward said end wall, said head having an inlet passage and an outlet passage extending into said cylinder, said end wall having an inlet passage and an outlet passage extending into said cylinder, each one of said inlet passages having a different check valve therein adapted to open in the direction toward the chamber, and each one of said outlet passages having a different check valve therein adapted to open in the direction away from said chamber.

5. A vacuum booster pump comprising a body formed with a cavity having one portion adapted to be connected to a source of oil vapor and another portion thereof forming an inner cylindrical chamber, a piston slidably mounted within said cavity and including means forming a sliding seal with the wall of said cylindrical chamber, an end wall closing one end of said cylindrical chamber to form a pumping chamber with said piston, a piston rod fixed to said piston and slidably extending through an opening in said end wall into said one cavity portion, said rod having a sufficiently loose fit in said opening for entry of sufficient oil vapors therethrough into said pumping chamber for lubricating said piston without substantial air leakage from said pumping chamber, said body having an inlet passage and an outlet passage extending into said pumping chamber, a first check valve within said inlet passage and adapted to open in the direction of flow into said pumping chamber, a second check valve within said outlet passage and adapted to open in the direction of flow away from said pumping chamber, and means to reciprocate said piston within said cylindrical chamber, said means including a member movably mounted within said one body cavity portion with one end of said piston rod in the path of movement of said member, said outlet passage opening into said one cavity portion.

6. A vacuum booster pump comprising a body formed with a cavity having one portion adapted to be connected to the crankcase of an internal combustion engine containing oil vapors under operating conditions and another portion thereof forming an inner cylindrical chamber, a piston slidably mounted within said cavity and including means forming a sliding seal with the wall of said cylindrical chamber wall, an end wall closing one end of said cylindrical chamber to form a pumping chamber with said piston, a piston rod fixed to said piston and slidably extending through an opening in said end wall into said one cavity portion, said rod having a sufficiently loose fit in said opening for entry of sufficient oil vapors therethrough into said pumping chamber for lubricating said piston without excessive discharge of air from said pumping chamber, said end wall having an inlet passage and an outlet passage extending into said pumping chamber, a first check valve within said inlet passage and adapted to open in the direction of flow into said pumping chamber, a second check valve within said outlet passage and adapted to open in the direction of flow away from said pumping chamber, and means to reciprocate said piston within said cylindrical chamber, said means including a lever pivotally mounted within said one body cavity portion with one end of said piston rod in the path of movement of one arm of said lever, said outlet passage opening into said one cavity portion.

7. A vacuum booster pump comprising a body housing formed with a cavity having one portion adapted to be connected to the crankcase of an internal combustion engine and another portion thereof forming an inner cylindrical chamber, a piston slidably mounted within said cavity and including means forming a sliding seal with said cylindrical chamber wall, an end wall closing one end of said cylindrical chamber to form a pumping chamber with said piston, a piston rod fixed to said piston and slidably extending through an opening in said end wall into said one cavity portion, said rod having a sufficiently loose fit in said opening for entry of sufficient oil vapors therethrough into said pumping chamber to lubricate said piston without excessive discharge of air therethrough, said housing having an inlet passage adapted to be attached to a vacuum operated accessory and extending into said pumping chamber and an outlet passage extending from said pumping chamber, a first check valve within said inlet passage and adapted to open in the direction of flow into said pumping chamber, a second check valve within said outlet passage and adapted to open in the direction of flow away from said pumping chamber, and means to reciprocate said piston within said cylindrical chamber, said means including a member movably mounted within said one body cavity portion with one end of said piston rod in the path of movement of a part of said member and another part of said member extending outside of said one body cavity portion and adapted to be mounted in contact with an engine driven part, said outlet passage opening into said cavity portion whereby condensed oil vapor passing into said pumping chamber past said piston rod may be pumped back into said one cavity portion.

References Cited in the file of this patent
UNITED STATES PATENTS

| | | |
|---|---|---|
| 2,022,643 | Hueber et al. | Nov. 26, 1935 |
| 2,189,526 | Babitch | Feb. 6, 1940 |
| 2,685,776 | Oishei et al. | Aug. 10, 1954 |
| 3,006,535 | White | Oct. 31, 1961 |